May 9, 1933.  G. G. GOING  1,908,140
TYPEWRITING MACHINE
Filed Jan. 10, 1929    5 Sheets-Sheet 1
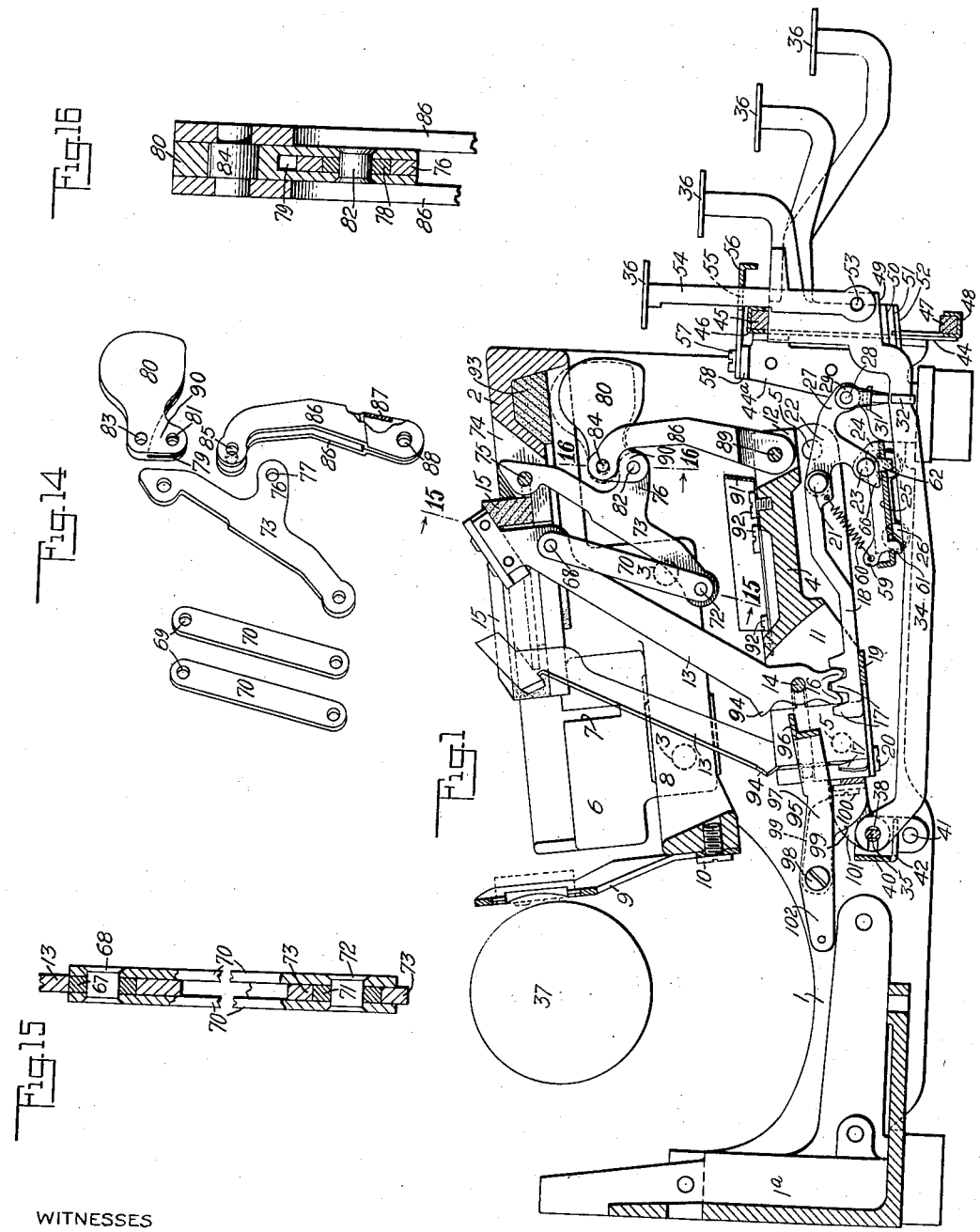
WITNESSES
INVENTOR
G. G. Going
BY Barton A. Bean, Jr.
ATTORNEY

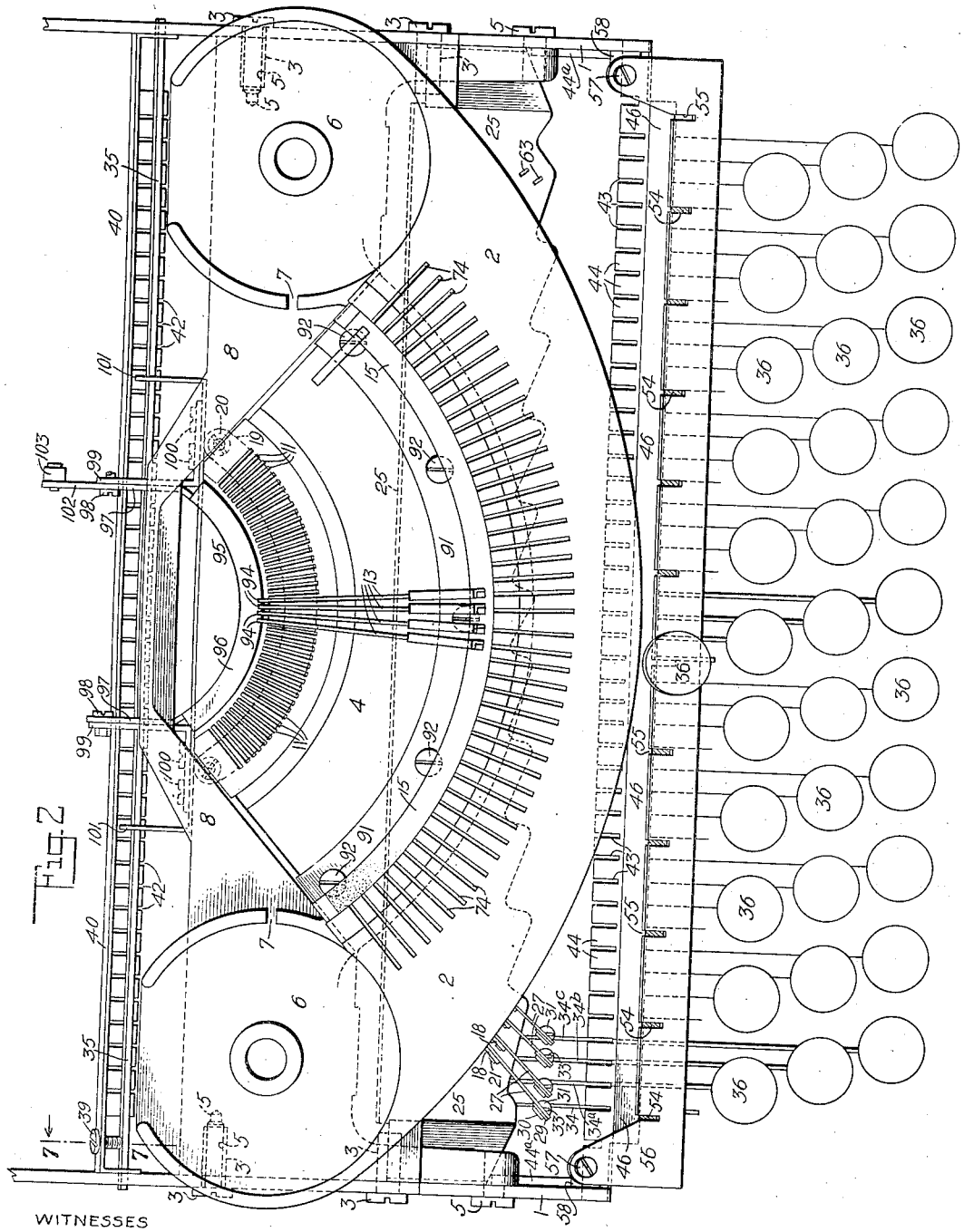

May 9, 1933.                G. G. GOING                1,908,140
                         TYPEWRITING MACHINE
                         Filed Jan. 10, 1929          5 Sheets-Sheet 3
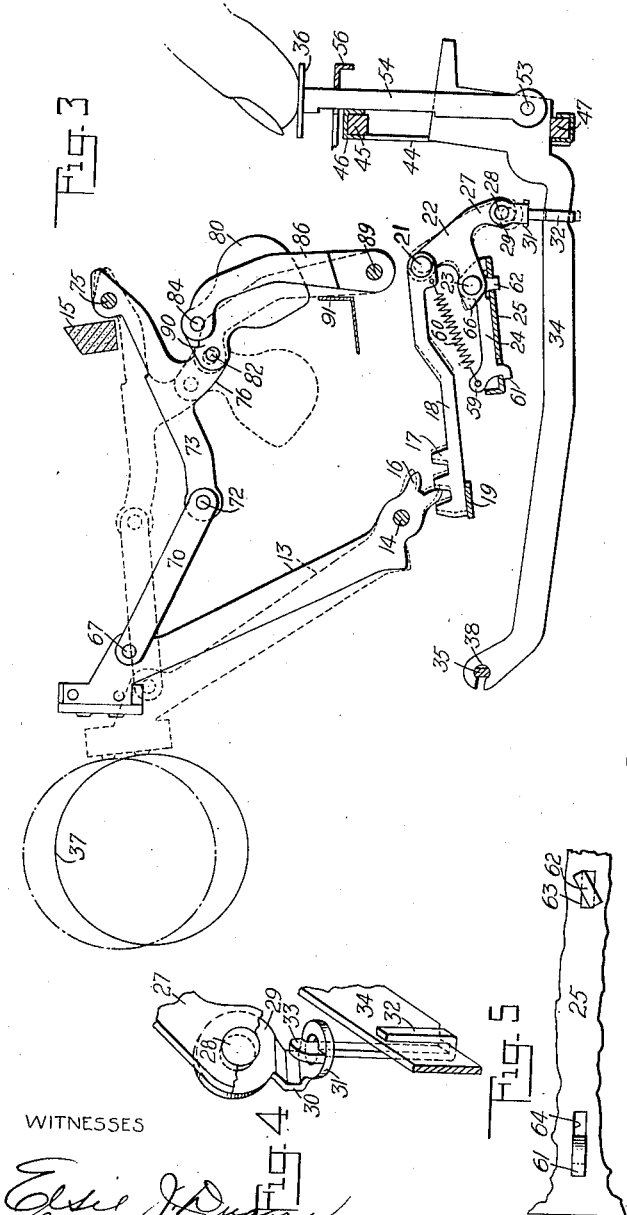
WITNESSES
INVENTOR
G. G. Going
BY Barton A. Bean Jr.
ATTORNEY

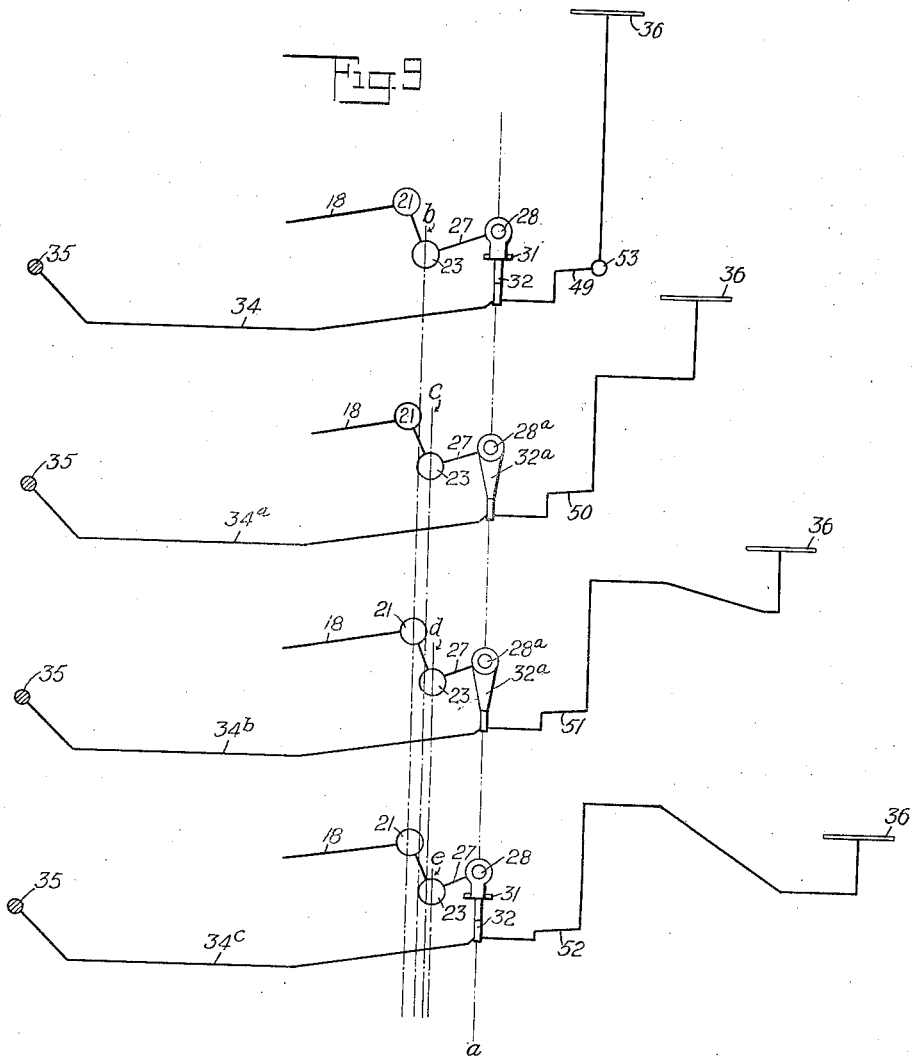

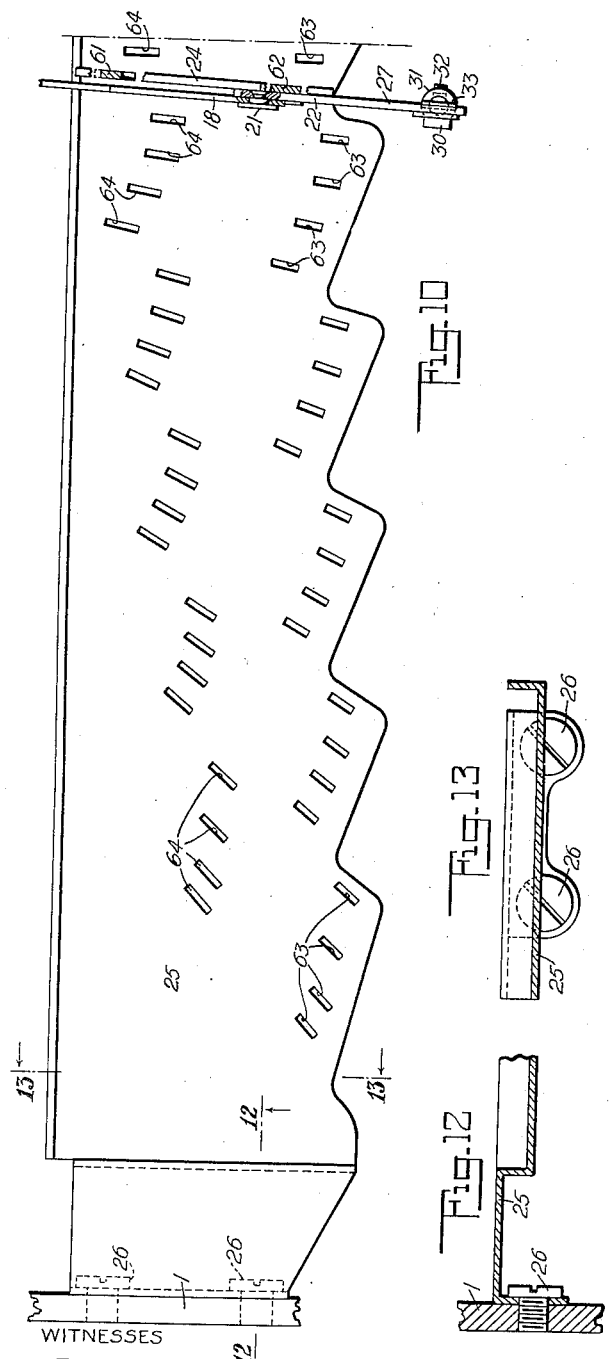
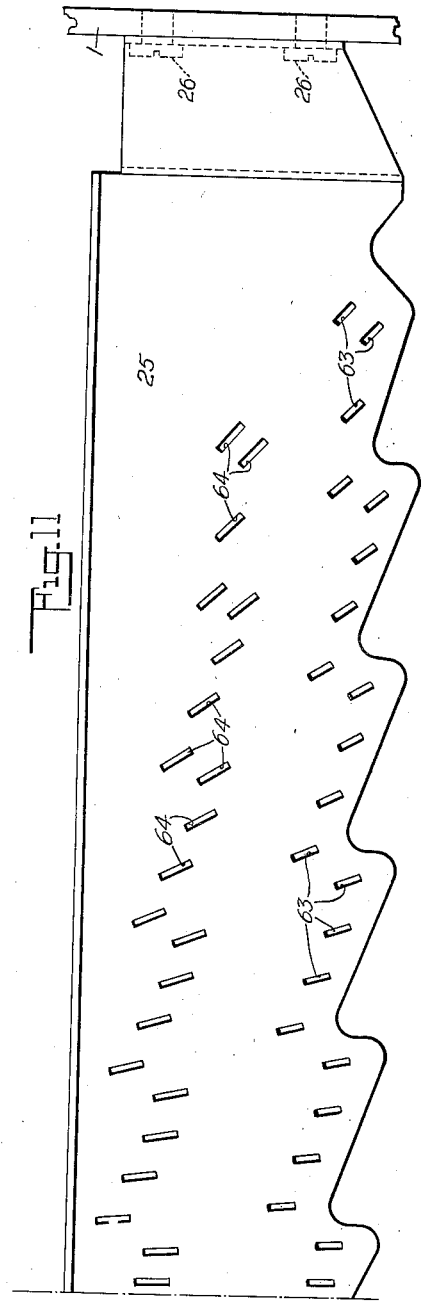

Patented May 9, 1933

1,908,140

UNITED STATES PATENT OFFICE

GEORGE G. GOING, OF GLENBROOK, CONNECTICUT, ASSIGNOR TO REMINGTON TYPEWRITER COMPANY, OF ILION, NEW YORK, A CORPORATION OF NEW YORK

TYPEWRITING MACHINE

Application filed January 10, 1929. Serial No. 331,534.

My invention relates to typewriting machines and more particularly to type actions thereof and to the system of type action and associated parts.

One of the main objects of my invention, generally stated, is to provide an easy operating, speedy, comparatively simple and yet highly efficient type action which is noiseless, or substantially so, in its operation and may be manufactured at a comparatively small cost.

A further object of the invention is to provide a type action of the character specified which by reason of its compactness lends itself to the production of a small compact machine such as is required for a portable typewriter.

A still further object of the invention is to provide an eighty-eight character machine of the kind specified and in which a standard four-bank keyboard with a single case shift may be employed.

To the above and other ends which will hereinafter appear, my invention consists in the features of construction, arrangements of parts and combinations of devices set forth in the following description and particularly pointed out in the appended claims.

In the accompanying drawings, where like reference characters indicate corresponding parts in the different views:—

Fig. 1 is a full sized, vertical, fore and aft, central sectional view of a typewriting machine, (with parts omitted), embodying features of the present invention.

Fig. 2 is a top plan view of the same.

Fig. 3 is a skeletonized side view of one of the central type actions shown in actuated position.

Fig. 4 is an enlarged, detail, perspective view showing one of the connecting devices between a key lever and its associated sub-lever.

Fig. 5 is a fragmentary, bottom plan view showing a portion of the supporting plate and the fastening devices of one of the sub-lever hangers.

Fig. 6 is an enlarged, detail, fragmentary, side view, with parts in section, of a group of four sub-levers and associated parts.

Fig. 7 is an enlarged, detail, sectional view of the pivot rod for the key levers and associated parts, the section being taken on the line 7—7 of Fig. 2 and looking in the direction of the arrows at said line.

Fig. 8 is a like view of the same with a key lever, showing the method of introducing the key levers in place.

Fig. 9 is a diagrammatic side view of four key levers of different length and some of the actuating connections associated therewith.

Figs. 10 and 11 taken together represent, on an enlarged scale, the supporting plate for the sub-levers, one of the sub-levers and its hanger being indicated in Fig. 10.

Figs. 12 and 13 are sectional views of said supporting plate, the sections being taken respectively on the lines 12—12 and 13—13 of Fig. 10; the arrows at said lines indicating the directions from which the sections are viewed.

Fig. 14 shows in perspective and detached elements of the type bar controlling means.

Fig. 15 is a fragmentary, enlarged, detail sectional view taken on the line 15—15 of Fig. 1 and looking in the direction of the arrows at said line.

Fig. 16 is an enlarged, detail, fragmentary sectional view taken on the line 16—16 of Fig. 1 and looking in the direction of the arrows at said line.

The present invention may be said to be in the nature of an improvement on the construction disclosed in my Patents Nos. 1,471,152 and 1,471,153 dated Oct. 16, 1923, with the hereinbefore mentioned objects in view.

It is desirable, ordinarily, in machines of the so-called noiseless type, to make the stroke of the type bar as short as possible because, for one reason, the longer the stroke of the bar the more apt, ordinarily, there is to be a production of noise in the operation of the type actions. It also, ordinarily, is true that the longer the stroke of the type bar the longer is the throw of the momentum accumulator, where one is employed, and this also is apt to result in the production of more noise in the operation of the type action. Therefore, while it is desirable, ordinarily, for the above and other reasons, to provide a type action with a type bar having a very short stroke, it is not always feasible to provide such a type action. Thus, for instance, where a comparatively large number of actions in a visible writing machine are to be employed, as for example, where forty-four type actions are included so that an eighty-eight character machine with a standard four-bank keyboard and a single case shift may be produced, it is essential that the distance between the printing point and the type heads, when the latter are at rest, shall be greater than where fewer type actions are included in the machine. This is necessary in order that the required number of type actions may be included within a comparatively small segmental space and yet afford sufficient clearance between the parts of the different actions.

In accordance with my present invention I am enabled to mount forty-four type actions, with two types on each bar, in the machine; to provide a single case shift, (in the present instance of the platen) with a standard four-bank keyboard, and with the type faces located about two and five-eighths inches from the printing point and moving through about 62°. This I am enabled to accomplish while at the same time providing a noiseless, or substantially noiseless, type action which is comparatively inexpensive to manufacture, is very light in its touch, is rapid and highly efficient in use and is so compact in construction as to enable me to construct a small, compact and light portable typewriter embodying the invention. It should be understood, however, that the invention is not restricted to embodiment in a portable machine but may be employed in comparatively large standard machines.

In the drawings there is represented so much of a portable typewriting machine as is necessary to arrive at an understanding of my invention in its embodiment therein, Figs. 1 and 2 being a full size representation thereof.

The frame of the machine comprises side plates 1 which are firmly united by a rear cross plate on bar 1ª, two intervening segments and other parts to be hereinafter described. The uppermost of these segments is designated as a whole by the reference numeral 2 and is secured to the side plates by screws 3, whereas the lower segment is designated as a whole by the reference numeral 4 and is secured to the side plates by screws 5.

The upper segment 2 is formed with ribbon spool pockets 6 therein having slots 7 in the inner walls for the passage of the ribbon. A rearwardly extending integral yoke-like portion 8 is formed on the segment 4 to provide a support for a type guide 9 secured to the yoke by screws 10. The segments 2 and 4 and side plates 1 and rear cross plate 1ª are preferably made of aluminum or an alloy thereof.

The lower segment 4 is a double segment having a series of radially arranged saw kerfs or guide slots 11 at the rear concave edge thereof, and a second series of radially disposed saw kerfs or guide slots 12 at the forward convex edge thereof. Companion slots 11 and 12 are arranged in the same radial plane, all of said planes converging just forward of the printing point.

Segmentally arranged type bars 13 are pivoted in the radial slots 11 on a pivot wire 14 to swing through approximately 62° to the printing point; the types when at rest in the basket being about two and five eighths inches from the printing point. This provides sufficient room in the type baskets in which to mount forty-four type bars and yet provides sufficient clearance between them. Each type block carries two types formed the same as in the No. 6 Remington Noiseless machine and each type block coacts with the type guide 9 that has lateral guide faces but is ineffective to control the type block for up and down displacement; the pivot of the type bar being relied upon for this purpose.

Each type block normally rests against a segmental pad or type rest 15 supported on top of the segment 2.

From an inspection of Fig. 1 it will be seen that the plane of the pivot wire 14 is at an angle of 90° to a plane passing tangentially of the platen through the printing line. By constructing and arranging the parts in the manner herein shown and described it is possible to provide type bars without lateral bends therein at the sides of the system, each type bar throughout the system being a straight type bar or a bar devoid of any lateral bend therein. Due to this fact I am enabled to employ a greater number of type bars in a given space than is possible in a construction wherein the type bars at the sides of the system are bent laterally, as is usually the case.

The depending portion of the heel of each type bar is provided with downwardly extending teeth 16 received in the associated guide slot 11 and meshing with upwardly extending teeth 17 on a companion actuating member in the nature of a slide 18. Each slide is received and works radially in the companion guide slot 11 and is supported in place therein by a segmental supporting strip 19 detachably secured to the bottom of the segment 4 by screws 20. From what has been said it will be understood that slides 18 have a radial arrangement that corresponds to the slots 11 and the type bars received therein.

The forward end of each slide 18 is pivoted at 21 to one arm of a three-arm angular sub-lever 22. A depending arm of this lever is pivoted at 23 to a hanger 24 mounted on a supporting plate 25 which at its ends is secured by screws 26 to the side plates 1 of the frame. The forwardly extending arm 27 of each sub-lever is pivoted at 28 to one member 29 of a two-part swivel. This member is preferably made of sheet metal with an off-set bend or goose neck 30 therein and a substantially horizontally disposed eye or apertured portion 31. The other member of the swivel comprises a substantially U-shaped connecting device 32 one arm of which is continued up and passes through the eye 31 above which said arm is provided with a substantially T-shaped cross-head 33. The lower end portion of the member 32 provides an open-mouth hook, loop or pocket in which the companion key levers 34, 34ª, 34ᵇ, or 34ᶜ is adapted to seat itself and provide for a movement of the loop independently of its key lever as indicated in dotted lines in Fig. 3, for purposes which will hereinafter appear.

The key levers have a parallel, or substantially parallel, arrangement and extend fore and aft of the machine, whereas the sub-levers are radially disposed, each sub-lever working in the same radial plane as the companion slide 18 and type bar 13. It follows, therefore, that the key levers and their companion sub-levers have different angular relations one to the other from the center to the sides of the system, as will be understood from a consideration of Fig. 2, the sub-lever for each terminal type bar being disposed at the greatest angle to its companion key lever.

The swivel connections described above for connecting the key levers and sub-levers are in the nature of self finding connections which enable them to accord and not interfere with the varying angular relations between the key lever and sub-lever which they connect, depending on their location in the system.

For the two central type actions of the system the use of swivels to connect the key levers and sub-levers is unnecessary as such levers in each instance are in the same plane, and not in diverging planes, as in the other type actions of the system. Therefore, for these two central type actions I employ loops 32ª (see Fig. 9) which are like the previously described members 32 except that the long arm of the loop is pivoted directly to its sub-lever as indicated at 28ª in Fig. 9.

It will be seen from an inspection of Figs. 2 and 9 that the forward ends of the arms 27 of the sub-levers are all arranged in a straight line across the machine, as indicated by the dotted line a in Fig. 9. It also will be observed that plane of each sub-lever 22 intersects the plane of its companion key lever, and that the arm 27 of each sub-lever terminates directly above its associated key lever. Referring more especially to Figs. 2 and 4 it will be seen that each swivel 29, 32 unites its associated key lever and sub-lever on the line where the planes of the two levers intersect so that there is an avoidance of all side stress in the actions throughout the system.

The key levers are all mounted at their rear ends to turn on a pivot rod 35, are of four different lengths and provided with keys 36 arranged in four banks to accord with the arrangement of a standard four-bank keyboard with a single case shift, the platen 37 being the case shifted element in the present instance. The key levers of different lengths are designated by different reference characters because they differ somewhat and require to be separately described.

In the present instance all of the key levers are provided with open key-hole slots 38 by which they may be moved endwise on to the pivot rod 35 when the latter is turned in its bearings so as to present the slabbed-off sides of the pivot rod in register with the open-mouth of the key-hole slots in the key levers, as shown in Fig. 8. When the key levers are all in place on the pivot rod the latter is given a quarter turn as shown in Fig. 7, thereby providing a pivot bearing for the key levers and preventing their removal from the rod. A set screw 39 may be threaded into position to bring its inner end to bear against one of the flat faces on the rod (see Fig. 7) and thereby prevent it from accidentally turning in its bearings. The screw 39 is threaded into the body portion 40 of a comb plate secured by screws 41 to the side plates 1 of the frame. A forwardly extending portion of the comb plate is slotted at 42 to receive the rear end portions of the key levers and maintain them spaced apart at the rear ends. The key levers at their forward ends also pass through guide slots 43 in a comb plate 44 secured at its ends to brackets 44ª which in turn are secured by screws to the side plates 1.

The upward motion of the key levers to normal position is limited by a pad 45 supported in a metal containing trough or supporting member 46 attached to the brackets 44ª. The downward motion of the key levers is arrested by a pad 47 supported in a trough-like metal support 48 secured to the brackets 44ª.

In order to provide for a uniform leverage throughout the system I construct and arrange the parts as follows:

Referring more particularly to Fig. 9 it will be understood that, as hereinbefore explained, the key levers are of four different lengths, those with keys in the uppermost or first bank being the shortest and those with keys in the lowermost or fourth bank being the longest, and that the connecting links or swivels between the key levers and sub-levers are all arranged in a straight line $a$ extending transversely of the machine. In order to compensate for the varying lengths of key levers I vary the length of arms 27 of the sub-levers 22. This will be understood from a consideration of the dotted lines $b$, $c$, $d$ and $e$ in Fig. 9 from which it will be seen that the shortest key lever 34 is connected to a sub-lever having the longest arm 27, whereas the longest key lever $34^c$ is connected to a sub-lever having the shortest arm 27. The key levers $34^a$ and $34^b$ likewise are connected to sub-levers having arms 27 of lengths properly proportioned to accord with the lengths of the key levers to which they are connected. In this manner the leverage throughout the system is made uniform.

In order to provide for a uniform dip of the printing keys I provide variably arranged contacts or stop faces on the key lever for cooperation with the stop pad 47. This will be understood from a consideration of Figs. 1 and 9 from which it will be seen that the stop faces or contact edges 49, 50, 51 and 52 on the key levers are arranged so that they are at progressively greater distances from the arresting pad 47 when the parts are in normal position, the contact edge 49 for the shortest key lever being located furthest from the arresting pad and the contact edge 52 for the longest key lever being normally closest to the arresting pad. By these means the printing keys 36 will receive a uniform extent of dip throughout the keyboard.

I prefer to make each of the key levers $34^a$, $34^b$, and $34^c$ from a single integral piece, but prefer to make each of the key levers 34 which carries a key for the first or upper bank differently. Thus, each key lever 34 has pivoted thereto, at 53, a key stem 54 carrying a key 36 at its upper end. Each key stem 54 is received and works in a guide slot 55 (see Fig. 2) provided in one edge of a guide plate 56 secured by screws 57 on ears 58 of the brackets $44^a$. The side and forward walls of the slots 55 coact with the key stems to hold them against sidewise and forward movement, whereas the front wall of the pad support 46 coacts with the rear edges of the key stems to prevent backward movement thereof. The key stems 54 are thus guided for vertical movement to prevent the keys of these shortest key levers from tilting in the actuation thereof.

I have hereinbefore indicated that notwithstanding the arms 27 of the sub-levers are of different lengths, the front ends thereof are in alignment across the machine. It becomes necessary therefore not only to locate the sub-levers in different radial planes, but also at different distances fore and aft of the machine depending on the lengths of the arms 27. This will be understood from a consideration of Figs. 6 and 9 and from the varying distances of the pivots 23 of the sub-levers with reference to the dotted line $a$ in Fig. 9. Therefore, the hangers 24 are located in various positions on the supporting plate 25 in a manner which will now be indicated.

It will be seen that each hanger 24 has a rearwardly extending apertured ear 59 to which is connected one end of a contractile returning spring 60, the opposite end of said spring being connected to the associated slide 18. This spring constitutes the only returning spring for the entire type action. Each hanger has two depending projections 61 and 62, the projection 61 being a hook-like extension. The supporting plate 25, as indicated in Figs. 10 and 11, is provided with forward apertures 63, and rear apertures 64, companion apertures 63 and 64 for each hanger being disposed in a radial plane corresponding substantially to the plane of the associated hanger 24, sub-lever 22, slide 18 and type bar 13. Each aperture 64 is of a length which will receive the projection 61 of the companion hanger and permit it to be shifted lengthwise and rearward to bring the bill of the hook beneath the under side of the supporting plate and interlock therewith, as shown in Fig. 6. The forward end of the hanger may then be lowered permitting the projection 62 to enter its aperture 63 in which it has a snug fit that prevents any forward shifting of the hanger that would result in releasing the projection 61 from interlocking engagement with the supporting plate. After the hanger is introduced into position in the manner indicated the lower end of the projection 62 is given a slight twist with the aid of a pair of pliers, as indicated in Fig. 5, to lock the hanger against accidental detachment. The metal from which the hanger is made is such as to permit this bending or twisting of the projection 62 as explained. I prefer to slightly score or sever the metal at the forward and rear edges of each projection 62, as indicated at 65 in Fig. 6, in order to facilitate a slight shearing of the metal at these points when the projection is twisted as described, so that an interlocking engagement may be effected beween each projection 62 and the supporting plate.

Each sub-lever 22 is formed with a rearwardly extending projection or stop 66 free from contact with the supporting plate 25 when the parts are assembled in the machine and at this time are inactive. When, however, the sub-levers are disconnected from the type bars and from the key levers, the spring 60 will turn said sub-levers a slight distance in an anti-clock-wise direction from the position shown in Fig. 6 until the stops 66 contact with the supporting plate 25 and arrest them against further movement under the reaction of the springs. This is in order that the parts may be maintained in positions where connections between the sub-levers and key levers and between the slides 18 and the type bars may be readily effected and aids materially in assembling and connecting the parts.

It will be understood that in assembling the machine each type bar may be lowered into position in its guide slot 11 and automatically connected with its slide 18 by the inter-engagement of the teeth 16 and 17. The pivot wire is then threaded through the pivot opening in the type bar and the next type bar is inserted in place and so on.

In some cases it may be found desirable to first mount all of the type bars on their pivot wire 14 and afterwards turn all of the slides 18 up into mesh with the type bars and then support them in this position by attaching the supporting strip 19 to the segment.

It will be seen that the segments 2 and 4, the pivot wire 14, the slides 18, the supporting plate 25, the type rest 15 etc. are all supported at an angle of about 8° to the horizontal causing the types to strike slightly above a horizontal line extending through the center of the platen. This gives a greater degree of visibility than in a construction in which the types strike on a horizontal line passing through the center of the platen, and nevertheless the type bars are actuated without side strain and with a uniform leverage throughout the system.

Thus far I have described the machine without reference to the type bar controlling means associated with each type action, and by which the type bar is slowed up as it approaches the printing position and the remainder of its movement to the printing point is effected by the stored energy of a momentum accumulator and associated parts after the printing key has been arrested, thereby effecting a substantially noiseless pressure imprint. These means will now be described.

Each type bar near the outer end thereof is apertured to receive a bushing 67 as shown in Fig. 15. A rivet 68 passes through this bushing and through coincident openings 69 in two parallel links 70, the rivet being headed at its ends. The links 70 thus pivoted to the type bar constitute one element or member of a toggle which is pivoted in a like manner by a bushing 71 and rivet 72 to the second element 73 of such toggle.

The toggle element 73 is of a single thickness and at its forward end is received and guided in a radial guide slot 74 in the segment 2, where the element is anchored and pivoted on a segmental pivot wire 75 carried by said segment.

From a consideration of Figs. 1 and 3 it will be seen that this toggle 70, 73 breaks downward from the substantially straight line, horizontal, pressure-applying position shown in dotted line in Fig. 3, and in returning to the normal position the force of gravity of the toggle members aids in effecting their quick restoration and also enables me to keep the height of the machine within the limits required by the type bars themselves.

Referring more particularly to Figs. 1, 14, 15 and 16 it will be seen that a forward extension or arm 76 on each toggle member 73 is pierced at 77 to receive a bushing 78. This pierced arm, with the bushing therein, is received in a slot 79 in a weighted member or momentum accumulator 80 having pierced openings 81 in the side walls of the slotted portion thereof. A rivet 82 passes through the openings 81 and 77 and through the central opening in the bushing 78, thus pivotally connecting the member 80 to the associated toggle member 73. The weighted member 80 is further pierced at 83 to receive a pivot 84 reduced at its ends for reception in pierced opening 85 in an upright toggle member comprising two parallel side plates 86 brought together at their lower ends and united by an integral cross piece 87, as shown in Fig. 14. The lower end of the member 86, 87 is received in a radial guide slot 12 in the segment 4 and is pierced at 88 to receive a segmental pivot rod 89 carried by said segment.

The arm 90 of each weighted member 80, situated intermediate the pivots 82, 84 thereof, constitutes the second arm or element of the second toggle, the other arm or element of which is the member 86, 87.

It will be understood that the slots 11, 12 and 74 for each type action are located in the same radial plane, and that each type bar, its double toggle 70, 73, 86, 90, its weight 80, slide 18 and sub-lever 22 all operate in the same, or substantially the same radial plane in which the corresponding slots 11, 12 and 74 are located.

A slightly resilient, segmental, metallic buffer plate 91 is secured along one edge or at its base to the segment 4 by screws 92, leaving the upper free edge portion in the path of the toggle arms 86. From an inspection of the dotted line showing in Fig. 3 it will be understood that at about the time when a type bar is in printing position the associated toggle arms 86 will coact with the buffer plate 91 and that the latter not only will prevent both toggles 73, 76 and 86, 90 from overthrowing to or beyond their straight line actuated positions, but will tend to effect a quick withdrawal of the type from printing position and a rapid restoration of the parts to normal position.

Referring more particularly to Figs. 1 and 3 it will be understood that in the normal position of the parts the pivots 82, 84 and 89 of each type action are disposed substantially in a straight line and that each toggle 86, 90 at this time has a substantially straight line position, whereas each weight 80 is off-set laterally from such line and the force of gravity of each weight is exerted to straighten the companion toggle 70, 73 and move the associated type bar towards the printing position. While this is the tendency of each weight 80, it in itself is, of course, insufficient to overcome the resistance of the remaining parts including the returning spring 60, but nevertheless produces a type action that has a very easy start which is an important factor. It will be seen, moreover, that each weight 80 in moving from its normal to its final position, shown in dotted lines in Fig. 3, moves always in the same general direction which corresponds to the general direction of movement of the type bar; that each weight does not change its direction of movement from the normal position until an imprint has been effected; that in making such movement the force of gravity of the weight 80 assists its movement as well as the remaining parts of the controlling devices and type bar through the entire extent of the key depression; that the travel of each weight 80 is in a comparatively short underslung arc; that after the parts have been actuated by the depression of the key to the full line Fig. 3 position, and the key has been arrested by the stop 47, the energy of the momentum accumulator or weight 80 will complete the movements of the parts to dotted line printing position; that at this time the toggle 86, 90 will again be brought into a straightened condition where the pivots 82, 84 and 89 are substantially in line and effect a straightening of the toggle 73, 76; and that at this time the force of gravity of the member 80 as well as the downwardly breaking toggle members 73 and 76 is exerted to effect a quick withdrawal of the type bar from the printing position and a quick restoration of the parts to normal position.

From an inspection of Fig. 1 it will be seen that after a type bar in its return movement to normal position reaches the type rest 15, the weighted member 80 may continue its reverse movement, as indicated in dotted lines, until it is arrested by a segmental pad 93 carried by the segment 2 and supported in a corresponding recess in the under side thereof. The effect of this continued reverse movement of the member 80 at the time and after the type bar reaches the type rest 15, is to cause a reactive force to be exerted against the type bar which will prevent it from rebounding from the type rest. Thus, it will be seen that this continued reverse movement of the member 80 tends to bring the pivots 82, 84 and 89 even nearer to a straight line position and that this movement reacts against the toggle members 73 and 70 resisting a rebound movement of the type bar. It will be understood that if in the reverse movement of the parts the pivots 82, 84 and 89 reached a straight line position, or if there was an overthrow of the parts beyond such position, a positive lock of the type bar against rebound would be effected. I prefer to rely on the mere reaction of parts described to prevent rebound and not the positive locking of the parts, and for this reason arrange the stop or pad 93 so that it will arrest the member 80 just before the pivots 82, 84 and 89 reach the straight line position.

The weighted member 80 does not always continue its movement to the dotted line position. The extent, if any, to which the member 80 will continue its reverse movement after the type bar reaches the position of rest in its return movement, depends entirely on the force with which the return is effected. This is self regulating. The greater the force of the return movement of the parts, the greater will be the tendency of the type bar to rebound, and the greater will be the extent of continued reverse movement of the member 80 and consequently the greater will be the reaction against the parts to prevent rebound of the type bar. This feature for preventing the rebound of the type bars constitutes an important factor of the present invention.

I prefer to actuate the universal bar for the carriage escapement mechanism from the type bars, and have provided each of the type bars 13 with a projection or contact 94 on the forward edge and near the heel thereof. As a type bar nears the printing position its projection 94 contactively engages a yoke-like, substantially U-shaped universal bar designated as a whole by the reference numeral 95. This universal bar is preferably made from a single piece of sheet metal with a forwardly projecting flange or contact portion 96 with which the projections 94 on the type bars coact. The side arms 97 of the universal bar are pivoted at 98 to bracket arms 99 secured by screws 100 to the segment 4. These same screws secure bracket arms 101 to the segment to provide additional support for the pivot rod 35. One of the arms 97 of the universal bar is extended rearward beyond its pivot to provide an actuating arm 102 carrying an anti-friction roller 103 by which the carriage escapement (not shown) is controlled.

It will be seen that the type bars are arranged at varying distances from the pivots of the universal bar and that, therefore, the universal bar would, ordinarily, not receive a uniform extent of movement from the different type bars. In order to compensate for the variation in the distances of the type bars from the pivots of the universal bar and give a uniform extent of movement thereto from all of the type bars, I so construct and arrange the parts that the universal bar is normally tilted so that its contact face 96 at the center of the machine is closer to and will be picked up sooner by the projections 94 on the center type bars, (which are furthest from the pivots 98), than by the projections 94 on the terminal type bars, which are nearest the pivots 98. This arrangement compensates for the positions of the type bars throughout the entire system, and provides a simple and efficient construction for effecting a uniform extent of movement of the universal bar notwithstanding the variation in the distances of the type bars from the pivots of the universal bar.

In the operation of the machine the depression of a key 36 is effective to actuate the corresponding type bar through the associated sub-lever and slide 18. During the earlier stages of the operation of the type bar, and until the parts reach the full line position shown in Fig. 3, the controlling weight and toggles are actuated by the type bar. It will be seen that this lasts throughout the depression of the key and until it is arrested by the stop 47. From this point and for the remainder of the printing stroke, the type bar will complete its movement by its own momentum and that of the double toggle and momentum accumulator 80, and mainly of the latter, which straightens the toggles and applies a pressure imprint. It will be seen that during the movement of the parts from the full to the dotted line position in Fig. 3, the connecting loop 32 moves independently of the associated key lever. It is essential, therefore, that the connections be such as to afford this independent movement of the parts otherwise the type bar would be blocked against movement to printing position.

It will be understood that in the present invention there are a number of factors that enter into consideration in producing a highly efficient machine of the character specified, some of which factors have been referred to but nevertheless will be hereinafter specified.

Although each type bar travels further in the present construction than in my prior patented constructions referred to, the connection, construction and arrangement of the parts, and the underslung arrangement of the momentum accumulator or weighted member 80 of the present invention enables me to cause said weighted member to travel through a comparatively small arc, which has a distinct advantage in slowing up the movement of the bar and effecting a pressure imprint therefrom substantially without noise. This makes for a quicker throw of the weighted member during the last part of the printing movement of the type bar and the first part of its return movement giving greater efficiency for the comparatively longer throw of the type bar and with less noise than could ordinarily be produced where such a long throw of the type bar is provided.

The underslung weighted member and downwardly breaking of the toggle also contributes materially to the production of a lower lying and more compact machine, valuable in the production of a portable machine.

A machine like the present one in which the force of gravity of the downwardly breaking toggle and the weighted member 80 tends to quickly return the type bar from the printing position aids in the production of an easy and rapidly operating machine.

The construction which provides for a straight line arrangement of the pivots of the toggle members 86 and 90 in the normal position of the parts as well as at the printing operation, together with the off-set arrangement of the weight 80 in both such positions contributes materially to the production of an action which has a very easy start and a quick return, the gravity of the weight in one case exerting its force to advance the type bar from normal position and in the other case to effect a rapid return thereof from the printing point.

The construction that enables the weight to continue its return movement after the type bar reaches its normal position of rest, and through the controlling connections to exert a reaction against the type bar rebounding from the type bar rest, constitutes a valuable factor.

The construction and arrangement of the parts whereby a substantially uniform leverage and extent of dip of the keys throughout the system and an avoidance of side strains is provided is of course a contributing factor in the production of a highly satisfactory, easy operating machine with a uniform touch.

There is an enclosing shell for the machine which it is not deemed necessary to illustrate.

It will be understood from the foregoing that I have provided a small, yet highly efficient visible, portable, typewriting machine in which the parts are compactly arranged to provide a machine of minimum height, which is noiseless or substantially noiseless in its operation and in which the parts are constructed, arranged and correlated with the above objects in views and in order to provide a comparatively cheap machine embodying an easy operating and rapid type action involving the use of a pivoted type bar.

I have filed a number of copending applications bearing Serial Nos. 232,582; 242,398; 242,799; 242,800; 252,399; 253,076; 254,744; 255,971 and 256,613 on constructions having some of the same general purposes in view as the present construction. The claims in this application are restricted to features not disclosed in said previously filed applications.

Various changes may be made in the construction, and some of its features may be employed without others, without departing from my invention as it is defined in the accompanying claims.

What I claim as new and desire to secure by Letters Patent is:

1. The combination of a type bar; means for actuating the type bar; and controlling means actuated by the type bar and operative thereon for causing said type bar to be applied with a pressure imprint in substantially a noiseless manner, said controlling means including a toggle that is substantially in a straight line position when an imprint is effected and which breaks downward from such position in the return of the type bar to normal position so that the force of gravity of the members of the toggle aids in breaking the toggle and in effecting a quick return of the type bar from the printing position as well as providing a comparatively low lying type action, and a weighted member beneath and effective on said toggle and the force of gravity of which weight is exerted when the parts are in normal position to tend to straighten said toggle and force the type bar towards the printing point.

2. The combination of a type bar; and controlling means for causing said type to be applied with a pressure imprint in substantially a noiseless manner, said controlling means including a toggle, and a weighted member effective on said toggle and the force of gravity of which weighted member is exerted to tend to straighten the toggle when the parts are in normal position and force the type bar towards the printing point, the weighted member continuing its motion in the same general direction as the type bar throughout the movement of the latter from normal to printing position and the force of gravity of said weighted member also being exerted to break the toggle from a substantially straightened position after an imprint has been effected.

3. The combination of a type bar; and controlling means for causing said type to be applied with a pressure imprint in substantially a noiseless manner, said controlling means including a weighted member, and means which enable the force of gravity of said weighted member to be exerted to tend to move the type bar towards the printing position when the parts are in normal position of rest and which enable the weighted member to move back beyond its normal position after the type bar returns to its normal position and to counteract the tendency of the type bar to rebound from normal position.

4. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle connected at one end to the type bar near the type carrying end thereof, and a second toggle operating on said first mentioned toggle and constructed and related so that the pivots of the members of said second toggle are brought approximately in a straight line when the parts are in normal position and are again in approximately a straight line condition when the type bar is in printing position.

5. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle connected at one end to the type bar near the type carrying end thereof, a second toggle operating on said first mentioned toggle and constructed and related so that the pivots of the members thereof are approximately in a straight line when the type bar is in normal position, and a momentum accumulator which applies its energy to straighten said toggles and apply pressure to the type bar at the last portion of the printing stroke.

6. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle constructed and related so that the pivots of the members of said toggle are brought substantially in line when the type bar is in normal position, and a momentum accumulator which applies its energy to straighten said toggle and apply pressure to the type bar at the last portion of the printing stroke, said momentum accumulator being so disposed in its normal position that force of gravity thereof tends to actuate said toggle and move the type bar to printing position.

7. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle constructed and related so that the pivots of the members of said toggle are brought substantially in line when the type bar is in normal position, and a momentum accumulator which applies its energy to straighten said toggle and apply pressure to the type bar at the last portion of the printing stroke, said momentum accumulator being disposed and connected so that in its return movement it may continue its motion after the type bar reaches the normal position and thereby control the toggle to tend to resist or counteract the tendency of the type bar to rebound from normal position.

8. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle constructed and related so that the pivots of the members thereof are brought substantially in line when the type bar is in normal position, and a momentum accumulator which applies its energy to straighten said toggle and apply pressure to the type bar at the last portion of the printing stroke, said momentum accumulator being connected and disposed so that the force of gravity thereof in the normal position of the parts tends to move the type bar towards the printing position and after the imprint is produced tends to effect a quick return of the type bar from printing position.

9. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle connected at one end to the type bar and anchored at its opposite end, a second toggle operating on said first mentioned toggle transversely thereof, and a momentum accumulator connected to said second toggle and having a continued movement in one and the same general direction as the type bar in the movement of the latter to the printing position, the construction and relation of the parts being such that the force of gravity of the momentum accumulator acting on said toggles tends to move the type bar from its normal position towards the printing position and also tends to cause both toggles to be quickly broken after the imprint is effected and bring about a quick return of the type bar from printing position.

10. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle connected at one end to the type bar and anchored at the opposite end, said toggle assuming substantially a straight line position when the type bar is printing and breaking downward from such position, a second toggle wholly underlying the first mentioned toggle when the latter is straightened and operating transversely thereon, the pivots of said second toggle being substantially in a straight line when the parts are in normal position and also when in the actuated position, and a momentum accumulator connected with said second toggle and off-set laterally from a line extending through the pivots thereof when they are brought into line either in the normal or in the actuated position of the parts, said accumulator being at all times below the anchorage of the first mentioned toggle.

11. The combination of a rigid type bar pivoted to swing in an arc to the printing position; a printing key; intermediate actuating connections between said key and type bar for setting the type bar in motion; and controlling means set in motion by the type bar for causing the latter to be applied with a pressure imprint substantially in a noiseless manner, said controlling means including a toggle connected at one end to the type bar and anchored at the opposite end, said toggle assuming substantially a straight line position when the type bar is printing and breaking downward from such position, a second toggle wholly underlying the first mentioned toggle when the latter is straightened and operating transversely thereon, and a momentum accumulator connected with said second toggle and off-set laterally from a line extending through the pivots thereof when they are brought into line, said accumulator being at all times below the anchorage of the first mentioned toggle, said second toggle attaining a substantially straight position in the normal and also in the actuated position and the force of gravity of the accumulator tending to move the type bar from normal position towards the printing position and also tending to break the toggles from the substantially straightened positions they assume when the printing is effected and thereby cause a quick return of the type bar from the printing point.

12. The combination of a type rest; a type bar; and means for controlling the movement of said type bar comprising a finger key, a toggle, a momentum accumulator which supplies the final energy necessary to straighten the toggle at the last part of the printing movement of the type bar, and means which afford a continued reverse movement of said momentum accumulator after the type bar in its return movement reaches the type rest and to thereby exert a reaction against the type bar rebounding from said type rest.

13. The combination of a type bar mounted to turn in an arc around a fixed pivot in front of and below the platen and to effect an impression from a type face against the front of the platen or the paper thereon, key actuated means for operating said type bar, and means set in motion by and operative for controlling the movement of said type bar comprising a toggle connected therewith and substantially horizontally disposed when the toggle is straightened to apply a pressure imprint, said toggle breaking downward from its straight line pressure applying position, a momentum accumulator operatively connected with said toggle and which when the toggle is in a straight line condition acts by its force of gravity to aid in breaking said toggle from said straightened condition, and a second toggle through which power is exerted from said momentum accumulator on the first mentioned toggle, the pivots of said second toggle being approximately in a straight line when the parts are in normal position.

14. The combination of a type bar mounted to turn in an arc around a fixed pivot in front of and below the platen and to effect an impression from a type face against the front of the platen or the paper thereon, and means for controlling the movement of said type bar comprising a toggle connected therewith and substantially horizontally disposed when the toggle is straightened to apply a pressure imprint, said toggle breaking downward from its straight line pressure applying position, a momentum accumulator operatively connected with said toggle and which supplies final energy to straighten the toggle at the last part of the printing movement of the type bar, and means which afford a continued reverse movement of said momentum accumulator after the type bar in its return movement reaches the normal position of arrest and to thereby exert a reaction against the rebound of the type bar from such position.

15. The combination of a type bar mounted to turn in an arc around a fixed pivot in front of and below the platen and to effect an impression from a type face against the front of the platen or the paper thereon, and means for controlling the movement of said type bar comprising a toggle connected to the type bar and substantially horizontally disposed when in the straight line position, a second toggle connected with and arranged wholly below and transversely of the first mentioned toggle when the type bar is in the printing position, a momentum accumulator underslung beneath the first toggle and connected rigidly with one of the members of said second toggle and which supplies the final energy to straighten both toggles at the last part of the pivotal movement of the type bar to printing position, the construction and arrangement of the parts being such that the momentum accumulator may receive a continued reverse movement after the type bar in its return movement reaches the normal position of arrest and thereby exert a reaction against the type bar rebounding from such position, a printing key, and means controlled thereby for setting up an operating movement of said type bar, toggles and momentum accumulator.

16. The combination of a type bar mounted to turn in an arc around a fixed pivot in front of and below the platen and to effect an impression from a type face against the front of the platen or the paper thereon, key operated means for actuating the type bar, and means set in motion by and controlling the movement of said type bar comprising a toggle having an upright member mounted to turn on a fixed pivot at its lower end, and a coacting member pivoted to the upper end of said upright member, a momentum accumulator connected to one of said toggle members and a second toggle connected to said type bar and breaking downward from substantially the straight line horizontal position that it assumes at the last part of the printing stroke of the type bar and at which time said second toggle is disposed entirely above said first mentioned toggle and the momentum accumulator.

17. The combination of a type bar mounted at its lower end to turn on a fixed pivot, a toggle pivoted at one end to the upper end of the type bar and at its other end to a fixed point and substantially horizontally disposed when in the straight line position and breaking downward from such position, a second toggle connected to the first mentioned toggle and located wholly below and transversely of the first toggle when the latter is straightened, a momentum accumulator forming a part of one of the members of said second toggle, the construction and arrangement of the parts being such that said accumulator may continue its movement after the type bar has reached its normal position of arrest and exert a reaction against the type bar rebounding from such position.

18. The combination of a key lever, a key actuated member having an off-set perforated ear, and a loop-like link through which said key lever extends and one side arm or member of which passes through a perforation in said ear, whereby said link may swivel to compensate for any differences in the planes of movement of said key lever and key actuated member.

19. In a typewriting machine, the combination of a series of radially disposed pivoted type bars, a series of key levers of different lengths, and intermediate connections between said key levers and type bars including radially disposed sub-levers having arms of different lengths in accordance with the differences in the lengths of the key levers in orders to compensate for the differences in lengths of the key levers and provide substantially a uniform leverage throughout the system.

20. In a typewriting machine, the combination of a series of radially disposed pivoted type bars, a series of key levers of different lengths, and intermediate connections between said key levers and type bars including radially disposed sub-levers having arms of different lengths in accordance with the differences in the lengths of the key levers in order to compensate for the differences in lengths of the key levers and provide substantially a uniform leverage throughout the system, and radially disposed slides connected to said sub-levers and operatively connected to said type bars.

21. In a typewriting machine, the combination of a series of radially disposed pivoted type bars, a series of radially disposed slides engaging and actuating said type bars, a series of radially disposed bell crank sub-levers connected to and actuating said slides, each associated type bar, slide and sub-lever moving in the same radial plane, a series of substantially parallel key levers, and connections between said key levers and sub-levers, each of said connections being substantially at the line of intersection of the planes of the associated key lever and sub-lever, said key levers being of different lengths and the sub-levers having arms of different lengths in accordance with the differences in lengths of the key levers in order to provide substantially a uniform leverage throughout the system.

22. In a typewriting machine, the combination of a series of radially disposed pivoted type bars, a series of key levers of different lengths, intermediate connections between said key levers and type bars including radially disposed sub-levers having arms of different lengths in accordance with the differences in the lengths of the key levers in order to provide substantially a uniform leverage throughout the system, and means for variably arresting the depression of the key levers in accordance with the differences in the lengths thereof in order to provide substantially uniform dip of the keys in the keyboard.

23. In a typewriting machine, the combination of a series of radially disposed pivoted type bars with rack teeth thereon, a series of radially disposed slides for actuating said type bars, each of said slides having rack teeth that engage the rack teeth on the associated type bar, a series of radially disposed bell crank sub-levers connected to and actuating said slides, a series of substantially parallel key levers, connections between said key levers and sub-levers, each of said connections being substantially at the line of intersection of the planes of the associated key lever and sub-lever, said key levers being of varying lengths and the sub-levers having arms that vary in length in accordance with the variation in length of the key levers in order to provide substantially a uniform leverage throughout the system, and means for variably arresting the depression of the key levers in accordance with the variation in the length thereof in order to provide substantially uniform dip of the keys in the keyboard.

24. In a typewriting machine, the combination of a series of radially disposed pivoted type bars, a series of key levers of different lengths, intermediate connections between said key levers and type bars including sub-levers having arms of different lengths in accordance with the differences in the lengths of the key levers in order to provide substantially a uniform leverage throughout the system, and means for supporting said sub-levers at varying points fore and aft of the machine in accordance with the differences in the lengths of the lever arms thereof for the purpose stated, whereby the ends of one set of lever arms of said sub-levers may be arranged substantially in line transversely of the machine notwithstanding the differences in the lengths thereof.

25. In a typewriting machine, the combination of a series of radially disposed pivoted type bars, a series of radially disposed slides engaging and actuating said type bars, a series of radially disposed bell crank sub-levers connected to and actuating said slides, each type bar and its associated slide and sub-lever moving in the same radial plane, a series of substantially parallel key levers, and connections between said key levers and sub-levers, each of said connections being substantially at the line of intersection of the planes of the associated key lever and sub-lever and comprising a swivel that accommodates itself to the variation in the planes of movement of the associated key lever and sub-lever relatively one to the other depending on the location of the associated type action in the system.

26. In a type action for typewriting machines, the combination of a sub-lever, a key lever, and an intermediate connection between the two comprising a member connected to the key lever and arranged in the plane thereof and providing for an independent continued movement of said member after the key lever reaches the limit of its depression, and a swivel connecting said member to the sub-lever.

27. In a type action for typewriting machines, the combination of a sub-lever, a key lever, and an intermediate connection between the two comprising an inverted substantially U-shaped member in which the key lever is seated, and a swivel connection between one arm of said substantially U-shaped member and the sub-lever.

28. In a type action for typewriting machines, the combination of a sub-lever, a key lever, and an intermediate connection between the two comprising an inverted substantially U-shaped member in which the key lever is seated, and a swivel connection between one arm of said substantially U-shaped member and an arm of the sub-lever located substantially above the opening in the U-shaped member.

29. In a typewriting machine, the combination of a system of type actions comprising a series of radially arranged type bars, a series of radially arranged sub-levers, a series of substantially parallel underlying key levers, each type bar and its associated sub-lever moving in the same radial plane and the plane of movement of each sub-lever intersecting the plane of movement of its associated key lever, and a swivel connection between each key lever and its associated sub-lever arranged at the line of intersection of the planes of movement thereof, whereby each swivel will accommodate itself to particular angular relation between the associated key lever and a sub-lever depending on the position thereof in the system of type actions.

30. In a typewriting machine, the combination of a supporting plate having apertures therein, and a hanger having integral depending projections received in apertures in the supporting plate, one of said projections being extended to underlie and interlock with the body portion of the supporting plate and secure the hanger in place without the aid of screws.

31. In a typewriting machine, the combination of a supporting plate having apertures therein, and a hanger having depending projections received in apertures in the supporting plate, one of said projections being extended to underlie and interlock with the body portion of the supporting plate and another projection bendable to interlock with the supporting plate and thus prevent an accidental detachment of the hanger.

32. In a typewriting machine, the combination of a supporting plate having apertures therein, a hanger having depending projections received in apertures in the supporting plate, one of said projections being extended to underlie and interlock with the supporting plate, a lever pivoted to said hanger at one end thereof, and a returning spring anchored to the opposite end of the hanger and operatively connected with said lever.

33. In a typewriting machine, the combination of a supporting plate having apertures therein, and a hanger having depending integral projections received in apertures in the supporting plate, one of said projections having a hook-like formation that engages under the supporting plate and interlocks therewith when said projection is in its aperture and the hanger is displaced longitudinally, and a second integral projection engaging a companion aperture in the supporting plate to prevent a longitudinal displacement of the hanger and a freeing of the hook-like projection from interlocking engagement with the plate, whereby said hanger may be detachably connected to said supporting plate without the aid of screws.

34. In a typewriting machine, the combination of a supporting plate having apertures therein, and a hanger having depending projections received in apertures in the supporting plate, one of said projections having a hook-like formation that engages under the supporting plate and interlocks therewith when said projection is in its aperture and the hanger is displaced longitudinally, and a second projection engaging a companion aperture in the supporting plate to prevent a longitudinal displacement of the hanger and a freeing of the hook-like projection from interlocking engagement with the plate, said second projection being bendable into interlocking engagement with the supporting plate to prevent a detachment of the hanger therefrom.

35. In a typewriting machine, the combination of a series of radially disposed pivoted type bars, a series of radially disposed slides engaging and actuating said type bars, a series of radially disposed bell crank sub-levers connected to and actuating said slides, a series of substantially parallel key levers, the key levers and sub-levers moving in intersecting planes, connections between said key levers and sub-levers, each of said connections being substantially at the line of intersection of the planes of the associated key lever and sub-lever, and a series of momentum accumulators connected with and actuated by the type bars and each moving in the radial plane of the associated type bar, whereby each type bar is slowed up as it approaches the printing position and a pressure imprint is effected in substantially a noiseless manner and there is an avoidance of lateral stress in the actions throughout the system.

36. In a typewriting machine, the combination of a series of radially disposed pivoted type bars with rack teeth thereon, a series of radially disposed slides for actuating said type bars, each of said slides having rack teeth that engage the rack teeth on the associated type bar, a series of radially disposed bell crank sub-levers connected to and actuating said slides, a series of substantially parallel key levers, the key levers and sub-levers moving in intersecting planes, connections between said key levers and sub-levers, each of said connections being substantially at the line of intersection of the planes of the associated key lever and sub-lever, and a series of momentum accumulators connected with and actuated by the type bars and each moving in the radial plane of the associated type bar, whereby each type bar is slowed up as it approaches the printing position and a pressure imprint is effected in substantially a noiseless manner and there is an avoidance of lateral stress in the actions throughout the system.

37. In a typewriting machine, the combination of a series of radially disposed pivoted type bars, a series of radially disposed slides engaging and actuating said type bars, a series of radially disposed bell crank sub-levers connected to and actuating said slides, a series of substantially parallel key levers, the key levers and sub-levers moving in intersecting planes, connections between said key levers and sub-levers, each of said connections being substantially at the line of intersection of the planes of the associated key lever and sub-lever, said key levers being of varying lengths and the sub-levers having arms that vary in length in accordance with the variation in length of the key levers in order to provide substantially a uniform leverage throughout the system, and controlling means connected with each type bar for slowing up its movement as it approaches the printing position and effecting a pressure imprint in substantially a noiseless manner, said controlling means comprising two toggles acting one on the other, and a momentum accumulator connected therewith and the energy of which is exerted to straighten the toggles, each type bar, its slide, sub-lever, toggles and momentum accumulator moving substantially in the same radial plane.

38. In a typewriting machine, the combination of a series of radially disposed pivoted type bars, a series of radially disposed slides engaging and actuating said type bars, a series of radially disposed bell crank sub-levers connected to and actuating said slides, a series of substantially parallel key levers, the key levers and sub-levers moving in intersecting planes, connections between said key levers and sub-levers, each of said connections being substantially at the line of intersection of the planes of the associated key lever and sub-lever and comprising a swivel that accommodates itself to the variation in the planes of movement of the associated key lever and sub-lever relatively one to the other depending on the location of the associated type action in the system, and controlling means connected with each type bar for slowing up its movement as it approaches the printing position and effecting a pressure imprint in substantially a noiseless manner, said controlling means comprising two toggles acting one on the other, and a momentum accumulator connected therewith and the energy of which is exerted to straighten the toggles.

39. In a typewriting machine, a system of type actions comprising a series of radially arranged type bars, a series of radially arranged sub-levers, a series of substantially parallel underlying key levers, the plane of movement of each sub-lever intersecting the plane of movement of its associated key lever, a swivel connection between each key lever and its associated sub-lever arranged at the line of intersection of the planes of movement thereof, whereby each swivel will accommodate itself to the particular angular relation between the associated key lever and sub-lever depending on the position thereof in the system of type actions, and controlling means connected with each type bar for slowing up its movement as it approaches the printing position and effecting a pressure imprint in substantially a noiseless manner, said controlling means comprising two toggles acting one on the other, and a momentum accumulator connected therewith and the energy of which is exerted to straighten the toggles.

40. In a typewriting machine, the combination of a series of segmentally arranged pivoted type bars, key actuated means for operating said type bars, controlling means for the type bars set in motion thereby and comprising a series of segmentally arranged double toggles, a fixed segmental slightly resilient metal buffer in the path of one of the elements of each double toggle and with which it coacts at about the time when the associated type bar reaches the printing position to prevent overthrow of the toggles and aid in effecting a rapid return of the actuated type bar from printing position, and key operated means for actuating said type bar.

41. In a typewriting machine, the combination of a series of segmentally arranged pivoted type bars, key actuated means for operating said type bars, controlling means for the type bars set in motion thereby and comprising a series of segmentally arranged double toggles, a fixed segmental slightly resilient metal buffer in the path of one of the elements of each double toggle and with which it coacts at about the time when the associated type bar reaches the printing position to prevent overthrow of the toggles and to aid in effecting a rapid return of the actuated type bar from printing position, said buffer comprising a segmental slightly resilient metal plate free along one curved edge where the toggle elements coact therewith and secured at its opposite edge or base to a fixed part of the machine.

42. In a typewriting machine, the combination of a series of segmentally arranged pivoted type bars, and a pivoted segmental universal bar actuated by said type bars, the type bars from the center to the sides of the system being at varying distances from the pivotal center of the universal bar and the contact face of the universal bar being normally disposed in a plane at an angle to a plane passing through the contact portions of the type bars which coact therewith, whereby the universal bar will be moved a uniform distance by all of said type bars.

43. In a typewriting machine, the combination of a series of segmentally arranged pivoted type bars, and a pivoted segmental universal bar actuated by said type bars, the type bars from the center to the sides of the system being at varying distances from the pivotal center of the universal bar, said universal bar being tilted so as to normally present its contact face in a plane at an angle to a plane passing through the contacts on the type bars which coact therewith, whereby the universal bar will be picked up by different type bars at different points in the strokes thereof but will be moved a uniform distance by all of said type bars.

44. In a typewriting machine, the combination of a series of segmentally arranged pivoted type bars, and a pivoted segmental universal bar actuated by said type bars, the type bars from the center to the sides of the system being at varying distances from the pivotal center of the universal bar, the relative disposition between the contact face of the universal bar and the portions of the type bars which coact therewith being normally such that a uniform extent of movement is transmitted to the universal bar notwithstanding the variation in the distance of the different type bars from the pivotal center of the universal bar.

45. In a typewriting machine, the combination of a series of radially disposed pivoted type bars the pivots of which are arranged in a plane at substantially right angles to a plane that extends tangentially of the platen at the printing line, a series of radially disposed slides engaging and actuating said type bars and each moving in the same radial plane as its associated type bar, a series of radially disposed bell crank sub-levers connected to and actuating said slides and each moving in the same radial plane as its associated type bar, a series of substantially parallel key levers, and connections between said key levers and sub-levers, each of said connections being substantially at the line of intersection of the planes of the associated key lever and sub-lever.

46. In a typewriting machine, the combination of a series of radially disposed pivoted type bars with rack teeth thereon, the pivots of said type bars being arranged in a plane at substantially right angles to a plane that extends tangentially of the platen at the printing line, a series of radially disposed slides for actuating said type bars, each of said slides having rack teeth that engage the rack teeth on the associated type bar and moving in the same radial plane as its associated type bar, a series of radially disposed bell crank sub-levers connected to and actuating said slides and each moving in the same radial plane as its associated type bar, a series of substantially parallel key levers, and connections between said key levers and sub-levers, each of said connections being substantially at the line of intersection of the planes of the associated key lever and sub-lever.

47. In a typewriting machine, the combination of a series of radially disposed pivoted type bars, a series of key levers which vary in length, intermediate connections between said key levers and type bars including radially disposed sub-levers having arms that vary in length in accordance with the variation in the length of the key levers in order to provide substantially a uniform leverage throughout the system, each type bar and its sub-lever moving in the same radial plane, and controlling means connected with each type bar for slowing up its movement as it approaches the printing position and effecting a pressure imprint in substantially a noiseless manner, said controlling means comprising two toggles acting one on the other and a momentum accumulator connected therewith and the energy of which is exerted to straighten the toggles, each type bar, its sub-lever, toggles and momentum accumulator moving substantially in the same radial plane.

48. In a typewriting machine, the combination of a series of pivoted type bars, key operated means for actuating each type bar, controlling means for each type set in motion thereby and comprising a toggle connected at one end to the associated type bar near the type carrying end of the latter and anchored at its opposite end, said toggle when straightened being substantially horizontally disposed, a second upright toggle connected at one end to the first mentioned toggle and anchored at its lower end, an underslung momentum accumulator connected to one of the elements of said second toggle, a single buffer in the path of the other element of each of said second toggles and with which it coacts at about the time when the associated type bar reaches the printing position to prevent overthrow of the toggles and to aid in effecting a rapid return of the type bar from printing position.

49. In a typewriting machine, the combination of a cylindrical platen, a series of segmentally arranged type bars, a type segment having radially disposed slots in which said type bars are pivoted, the plane in which the pivots of the series of type bars are located being at substantially right angles to a plane tangential with the platen at the printing line, a series of key actuated slides received and guided in said radially disposed slots and coacting with the type bars to actuate them, and a flat detachable support arranged in a plane parallel with the said plane in which the pivots of the type bars are located and underlying said slides and a removal of which permits a detachment of the slides from the type bars.

50. The combination of a type bar; key actuated means for actuating the type bar; and controlling means set in motion by and controlling the type bar and causing it to be applied with a pressure imprint in substantially a noiseless manner, said controlling means including a toggle set in motion by the type bar, and a weighted member effective on said toggle and the force of gravity of which weighted member is exerted to tend to straighten the toggle when the parts are in normal position and force the type bar towards the printing point, the weighted member continuing its motion in the same general direction as the type bar throughout the movement of the latter from normal to printing position.

51. The combination of a type bar; and controlling means for causing said type to be applied with a pressure imprint in substantially a noiseless manner, said controlling means including a toggle connected at one end to the type carrying end of the type bar to apply pressure thereon, a second toggle operatively connected to said first mentioned toggle, said second toggle assuming approximately a straight line or dead centered position when at rest in its normal position, and a momentum accumulator constructed and arranged to exert its force of gravity on said second toggle tending to break it from a straight line condition when the parts are in the normal position.

52. The combination of a type bar; and controlling means for causing said type to be applied with a pressure imprint in substantially a noiseless manner, said controlling means including a toggle connected at one end to the type carrying end of the type bar to apply pressure thereon, a second toggle operatively connected to said first mentioned toggle, said second toggle assuming approximately a straight line position at two different points, one approximately straight line position of the toggle being attained when the type bar is at rest in the normal position and the other at the last part of the printing stroke of the type bar, and a momentum accumulator constructed and arranged to exert its force of gravity on said second toggle tending to break it from a straight line condition when the parts are in the normal position.

53. The combination of a rigid type bar pivoted to swing in an arc to the printing position; a printing key; means controlled by said key for actuating the type bar; and controlling means set in motion by the type bar for controlling it and causing the type bar to be applied with a pressure imprint in substantially a noiseless manner, said controlling means including a toggle connected at one end to the type carrying end of the type bar to apply pressure thereon, a second toggle operatively connected to said first mentioned toggle and which second toggle assumes approximately a straight line position at two points in the movement of the type bar from the normal to the printing position, and a momentum accumulator constructed and arranged to exert its force of gravity on said second toggle tending to break it from a straight line condition when the parts are in normal position.

Signed at Stamford in the county of Fairfield and State of Connecticut this 8th day of January, A. D. 1929.

GEORGE G. GOING.